Aug. 30, 1955   A. T. WESTBERG   2,716,284
MEASURING DEVICE
Filed Oct. 3, 1951
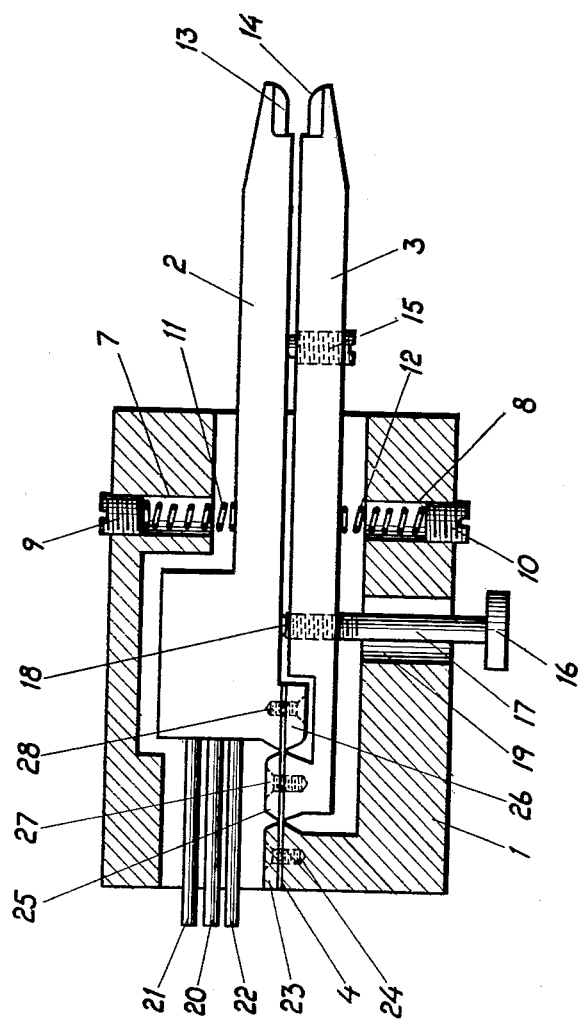
Inventor:
Alvar Torsten Westberg,
by Pierce, Scheffler & Parker,
Attorneys.

United States Patent Office 2,716,284
Patented Aug. 30, 1955

2,716,284
MEASURING DEVICE

Alvar Torsten Westberg, Sandviken, Sweden, assignor to Sandvikens Jernverks Aktiebolag, Sandviken, Sweden Application October 3, 1951, Serial No. 249,595
Claims priority, application Sweden October 4, 1950

5 Claims. (Cl. 33—149)

The present invention relates to a measuring device with two feeling members which according to the invention are fastened on a common elastic member in turn fastened to a body in such a way that they are movable mutually as well as relative to the said body and adjustable in a direction from each other by the objects which are to be measured.

The points of connection between the elastic member and the feeling members are suitably situated at the ends of the last-mentioned members, the elastic member preferably consisting of a leaf spring.

These and other objects of the invention will now be described more in detail with reference to the accompanying drawing in which a preferred embodiment of the invention is shown partly in section.

In the drawing the reference character 1 designates the body of the measuring device in which the ends of two feeling members 2 and 3 are accommodated. To the body 1 is by means of a pressure plate 23 and screws 24 fastened a comparatively thin leaf spring 4 which is likewise by means of plates 25 and 26 and screws 27 and 28 fastened to the feeling members 2 and 3 thus forming a pivot bearing for them. As will readily be seen the feeling members 2 and 3 can swing mutually as well as relative to the body 1. The other ends of the feeling members are provided with measuring edges 13 and 14 which may be formed by hard metal pieces mounted in the ends of the feeling members so that objects to be measured can be placed between them. Of course, even the measuring device itself may be caused to engage stationary objects. In threaded holes 7 and 8 formed in the body 1 screws 9 and 10 respectively are mounted which retain compression springs 11 and 12 respectively in engagement with the feeling members.

As will readily be seen from the drawing, the springs press on the feeling members in a direction towards each other and serve together with the screws 9 and 10 the purpose of obtaining a suitable feeling pressure and to set the angular position of the feeling members in the body I. The feeling members are set at the desired distance from each other by means of a screw 15 mounted in one of the feeling members such as member 3 against the action of the springs 11 and 12.

In the feeling member 3 is mounted an additional screw 17 provided with a hand knob 16 and extending through a hole in the body. This screw abuts a feeling member 18 of a measuring apparatus not shown in the drawing which is situated in the feeling member 2. The screw 17 serves the purpose of controlling the zero position of the measuring apparatus. The measuring apparatus indicates the mutual angular position of the feeling members 2 and 3 consequently the distance between the measuring edges 13 and 14. The measuring apparatus may be of the so-called deltameter-type i. e. the type comprising two pressure chambers connected to a common pressure medium source and each provided with a restricted inlet and a restricted outlet which restricted openings are controllable in dependence on a magnitude to be measured and so connected to an indicator device that the difference between the pressures in the pressure chambers acts upon the said device. In the drawing 20 designates a line connected to the common pressure medium source while 21 and 22 designate lines connecting the pressure chambers to the indicator device. Obviously any other suitable measuring apparatus than the one described here may be used for the purpose.

The described mounting of the feeling members 2 and 3 by means of the leaf spring 4 involves important advantages among which the following may be mentioned:

Any back lash at the mounting points is completely eliminated, which means a high degree of accuracy. The friction is reduced to a minimum. Wearing is out of question. The sensitiveness of the device is high if the leaf spring is sufficiently thin. Production costs are low.

The thickness of the leaf spring should suitably be less than 0.5 mm. preferably 0.1–0.3 mm. Further, the portions of the spring which are situated between the clamped leaf spring portions should be short, suitably not exceeding 2 mm.

The device described above is, of course, manually operable. However, it may be mounted in e. g. automatic machine tools such as automatic lathes which may be arranged in such a way that the measuring device is intermittently advanced into engagement with those portions of the work pieces which are to be measured.

It is to be understood that many modifications and changes may be made in the embodiments shown and described herein without departing from the scope of my invention as defined in the following claims.

Having now described my invention, what I claim as new and desire to secure by Letters Patent is:

1. In a measuring device, the combination comprising a body member establishing a support, an elastic member secured to said body and movable with respect to said body, and a pair of feeling members secured to said elastic member, said feeling members being movable relative to each other on said elastic member and both movable as a unit with said elastic member relative to said body and being movable from a preset position in a direction from each other by the objects to be measured.

2. A measuring device as defined in claim 1 wherein said feeling members are secured at their ends to said elastic member.

3. In a measuring device, the combination comprising a body member establishing a support, an elastic member secured to said body, and a pair of feeling members secured to said elastic member, said feeling members being movable relative to each other and relative to said body and being movable in a direction from each other by the objects to be measured, said elastic member being a spring leaf and said feeling members being secured at their ends opposite the feeling ends to opposite faces of said leaf.

4. In a measuring device, the combination comprising a body member establishing a support, a spring leaf secured at one end to said support, a pair of feeling members secured in confronting relation at their ends opposite the feeling ends to opposite faces of said leaf, spring means engaging said feeling members and urging said members towards each other, and means engageable with said feeling members for setting said members to a selected distance apart in opposition to the forces exerted by said spring means, said members being movable in a direction away from each other by the object to be measured counter to the forces exerted by said spring means.

5. A measuring device as defined in claim 4 and which further includes means mounted on one of said feeling members for measuring the distance or angle between said feeling members.

References Cited in the file of this patent

UNITED STATES PATENTS

| Number | Name | Date |
|---|---|---|
| 371,469 | Miller | Oct. 11, 1887 |
| 2,246,002 | Powers | June 17, 1941 |
| 2,465,869 | Halstead | Mar. 29, 1949 |
| 2,576,221 | Segerstad | Nov. 27, 1951 |